US012586205B2

(12) United States Patent
Ahmadi et al.

(10) Patent No.: US 12,586,205 B2
(45) Date of Patent: Mar. 24, 2026

(54) SYSTEM AND METHOD FOR DETECTING A BOUNDARY IN IMAGES USING MACHINE LEARNING

(71) Applicant: ROYAL BANK OF CANADA, Toronto (CA)

(72) Inventors: Elham Ahmadi, Toronto (CA); Ehsan Amjadian, Toronto (CA); Arthur Richard Berrill, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 244 days.

(21) Appl. No.: 17/966,629

(22) Filed: Oct. 14, 2022

(65) Prior Publication Data

US 2023/0118009 A1 Apr. 20, 2023

Related U.S. Application Data

(60) Provisional application No. 63/256,020, filed on Oct. 15, 2021.

(51) Int. Cl.
| | |
|---|---|
| *G06T 7/12* | (2017.01) |
| *G06T 9/00* | (2006.01) |
| *G06T 17/05* | (2011.01) |

(52) U.S. Cl.
CPC ............... *G06T 7/12* (2017.01); *G06T 9/002* (2013.01); *G06T 17/05* (2013.01);
(Continued)

(58) Field of Classification Search
None
See application file for complete search history.

(56) References Cited

U.S. PATENT DOCUMENTS

| | | | | | |
|---|---|---|---|---|---|
| 5,977,983 | A | * | 11/1999 | Einkauf | ................. G06T 17/20 |
| | | | | | 345/582 |
| 10,127,670 | B2 | * | 11/2018 | Lewis | ................... G06F 16/532 |

(Continued)

OTHER PUBLICATIONS

Microsoft COCO: Common Objects in Context, Lin et al., arXiv: 1405.0312v3 [cs.CV] dated Feb. 21, 2015.
(Continued)

*Primary Examiner* — Jason A Pringle-Parker
(74) *Attorney, Agent, or Firm* — NORTON ROSE FULBRIGHT CANADA LLP

(57) ABSTRACT

A computer-implemented system and method for detecting a boundary in an image are provided. The system includes at least one processor and memory in communication with said at least one processor, wherein the memory stores instructions, when executed at said at least one processor, cause said system to: receive or access a first image comprising a first polygon structure; generate, using a data model representing a neural network, a second image based on the first image by splitting the first polygon structure in the first image, wherein the second image comprises a first portion and a second portion partitioned by a line across the first polygon structure; and generate, based on the second image, a geo-image comprising corresponding spatial-reference information for one or more pixels in the geo-image, the geo-image comprising one of the first portion and the second portion in the second image.

20 Claims, 12 Drawing Sheets

(52) U.S. Cl.
  CPC .............. *G06T 2207/10032* (2013.01); *G06T 2207/20021* (2013.01); *G06T 2207/20084* (2013.01)

(56)           References Cited

U.S. PATENT DOCUMENTS

| | | | | |
|---|---|---|---|---|
| 2010/0272357 | A1* | 10/2010 | Maxwell | G06V 20/13 |
| | | | | 382/173 |
| 2017/0076438 | A1* | 3/2017 | Kottenstette | G06V 10/82 |
| 2018/0041536 | A1* | 2/2018 | Berlin | H04L 63/1416 |
| 2018/0285682 | A1* | 10/2018 | Najibi | G06T 7/194 |
| 2020/0327674 | A1* | 10/2020 | Yang | G06T 7/60 |
| 2021/0065417 | A1* | 3/2021 | Hartfiel | G06N 3/045 |
| 2021/0312632 | A1* | 10/2021 | Ma | G06V 10/267 |
| 2021/0374965 | A1* | 12/2021 | Richter | G06N 3/08 |

OTHER PUBLICATIONS

U-Net: Convolutional Networks for Biomedical Image Segmentation, Ronneberger et al., arXiv: 1505.04597v1 [cs.CV] dated May 18, 2015.
SegNet: A Deep Convolutional Encoder-Decoder Architecture for Image Segmentation, Badrinarayanan et al., arXiv:1511.00561v3 [cs.CV] dated Oct. 10, 2016.
DeepLab: Semantic Image Segmentation with Deep Convolutional Nets, Atrous Convolution, and Fully Connected CRFs, Chen at al., perforarXiv: 1606.00915v2 [cs. CV] dated May 12, 2017.
Encoder-Decoder with Atrous Separable Convolution for Semantic Image Segmentation, Chen et al., arXiv: 1802.02611v3 [cs. CV] dated Aug. 22, 2018.
UNet++: A Nested U-Net Architecture for Medical Image Segmentation, Zhou et al., arXiv: 1807.10165v1 [cs.CV] dated Jul. 18, 2018.
CNNs Fusion for Building Detection in Aerial Images for the Building Detection Challenge, Delassus et al., arXiv: 1809.10976v1 [cs. CV] dated Sep. 28, 2018.
Image Segmentation Using Deep Learning: A Survey, Minaee et al., arXiv:2001.05566v5 [cs.CV] dated Nov. 15, 2020.
A Semantic Segmentation Network for Urban-Scale Building Footprint Extraction Using RGB Satellite Imagery, Jiwani et al., arXiv:2104.01263v2 [cs.CV] dated Nov. 19, 2021.
Fully Residual Convolutional Neural Networks for Aerial Image Segmentation, Sang et al., SoICT 2018, dated Dec. 6-7, 2018.
An Improved Algorithm for Semantic Segmentation of Remote Sensing Images Based on Deeplabv3+, Li et al.
An aerial image segmentation approach based on enhanced multi-scale convolutional neural network, Li et al., IEEE, 2019.
Semantic Segmentation-Based Building Footprint Extraction Using Very High-Resolution Satellite Images and Multi- Source GIS Data, Li et al., Remote Sens. 2019, 11, 403; doi:10.3390/rs11040403.

\* cited by examiner

200

Output Layer

Hidden Layer

Input Layer

Original Image
resulted from Image
segmentation
model
910

Extracted polygons
From image
segmentation model
920

Reconstructed Image
resulted from
correction model
930

Extracted polygons
From recontructed
Image
940

Figure 10:
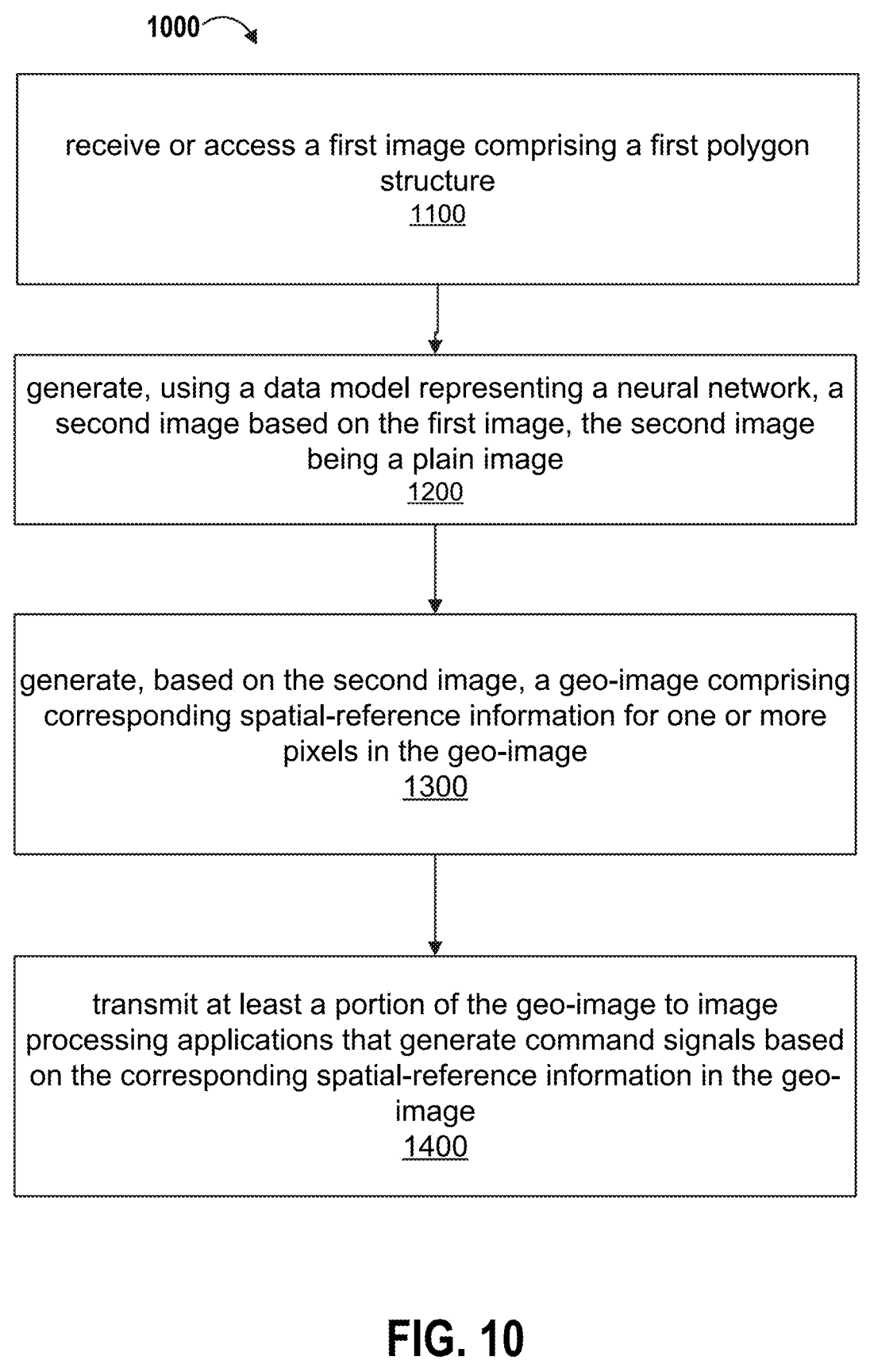

1000 receive or access a first image comprising a first polygon structure
1100 generate, using a data model representing a neural network, a second image based on the first image, the second image being a plain image
1200 generate, based on the second image, a geo-image comprising corresponding spatial-reference information for one or more pixels in the geo-image
1300 transmit at least a portion of the geo-image to image processing applications that generate command signals based on the corresponding spatial-reference information in the geo-image
1400

| Image Segmentation output | Polygon split/correct model output | Final extracted/assigned polygon in comparison to Ground Truth |
|---|---|---|
| 1210a | 1220a | 1230a / 1240a |
| 1210b | 1220b | 1230b / 1240b |

Sample images for polygons that a split took place based on correction model

FIG. 12

SYSTEM AND METHOD FOR DETECTING A BOUNDARY IN IMAGES USING MACHINE LEARNING

CROSS-REFERENCE TO RELATED APPLICATION

This application claims the benefit of and priority to U.S. provisional patent application No. 63/256,020 filed on Oct. 15, 2021, the entire content of which is herein incorporated by reference.

FIELD

The present disclosure generally relates to the field of image processing, and more specifically, to the field of image processing using machine learning.

BACKGROUND

Extracting polygon images with high accuracy from high resolution aerial images has a number of practical applications, such as urban planning, maintaining geospatial database, and property evaluation (e.g., estimating a market price or value of a specific property). In practice, deep learning based image segmentation techniques have been used for boundary detection in aerial images.

SUMMARY

According to an aspect, there is provided a computer-implemented system for detecting a boundary in images. The system includes at least one processor and memory in communication with said at least one processor, wherein the memory stores instructions, when executed at said at least one processor, cause said system to: receive or access a first image comprising a first polygon structure; generate, using a data model representing a neural network, a second image based on the first image by splitting the first polygon structure in the first image, wherein the second image comprises a first portion and a second portion partitioned by a line across the first polygon structure; and generate, based on the second image, a geo-image comprising corresponding spatial-reference information for one or more pixels in the geo-image, the geo-image comprising one of the first portion and the second portion in the second image.

In some embodiments, the corresponding spatial-reference information comprises at least one of: Global Positioning System (GPS) coordinates, geographic coordinate system (GCS) coordinates, projected coordinate system coordinates, Cartesian system coordinates, polar system coordinates, and geodetic datum.

In some embodiments, the geo-image is based on a Tagged Image File Format (TIFF).

In some embodiments, the first portion and the second portion are bifurcated by the line across the first polygon structure.

In some embodiments, an placement of the line is determined based on a graphical indication representative of a property located within the first polygon structure, and wherein the first or second portion of the second image comprises the graphical indication representative of the property.

In some embodiments, the neural network is an encoder, and the instructions when executed at said at least one processor cause said system to generate the second image using a variational autoencoder (VAE) including the encoder and a second neural network comprising a decoder.

In some embodiments, the VAE is trained by: computing a loss function based on the second image and a ground truth label image associated with the first image; and updating weights of the VAE based on optimizing the loss function.

In some embodiments, the encoder and decoder each comprises three convolutional layers.

In some embodiments, the instructions when executed at said at least one processor cause said system to further: generate a segmented image based on an aerial image comprising a plurality of properties, the segmented image comprising a plurality of segmented structures corresponding to the plurality of properties; generate a polygon image of the segmented image, the polygon image comprising a plurality of polygon structures corresponding to the plurality of segmented structures; and generate the first image based on the polygon image by selecting the first polygon structure from the plurality of polygon structures based on a given coordinate location of a property.

In some embodiments, the segmented image is generated based on a UNET-VGG16 neural network model.

In accordance with another aspect, there is provided a computer-implemented method for detecting a boundary in images, the method including: receiving or accessing a first image comprising a first polygon structure; generating, using a data model representing a neural network, a second image based on the first image by splitting the first polygon structure in the first image, wherein the second image comprises a first portion and a second portion partitioned by a line across the first polygon structure; and generating, based on the second image, a geo-image comprising corresponding spatial-reference information for one or more pixels in the geo-image, the geo-image comprising one of the first portion and the second portion in the second image.

In some embodiments, the corresponding spatial-reference information comprises at least one of: Global Positioning System (GPS) coordinates, geographic coordinate system (GCS) coordinates, projected coordinate system coordinates, Cartesian system coordinates, polar system coordinates, and geodetic datum.

In some embodiments, the geo-image is based on a Tagged Image File Format (TIFF).

In some embodiments, the first portion and the second portion are bifurcated by the line across the first polygon structure.

In some embodiments, an placement of the line is determined based on a graphical indication representative of a property located within the first polygon structure, and wherein the first or second portion of the second image comprises the graphical indication representative of the property.

In some embodiments, the neural network is an encoder, and the instructions when executed at said at least one processor cause said system to generate the second image using a variational autoencoder (VAE) including the encoder and a second neural network comprising a decoder.

In some embodiments, the VAE is trained by: computing a loss function based on the second image and a ground truth label image associated with the first image; and updating weights of the VAE based on optimizing the loss function.

In some embodiments, the method further includes, prior to receiving or accessing the first image: generating a segmented image based on an aerial image comprising a plurality of properties, the segmented image comprising a plurality of segmented structures corresponding to the plurality of properties; generating a polygon image of the segmented image, the polygon image comprising a plurality of polygon structures corresponding to the plurality of segmented structures; and generating the first image based on the polygon image by selecting the first polygon structure from the plurality of polygon structures based on a given coordinate location of a property.

In some embodiments, the segmented image is generated based on a UNET-VGG16 neural network model.

In accordance with yet another aspect, there is provided a non-transitory computer-readable storage medium storing instructions which when executed adapt at least one computing device to: receive or access a first image comprising a first polygon structure; generate, using a data model representing a neural network, a second image based on the first image by splitting the first polygon structure in the first image, wherein the second image comprises a first portion and a second portion partitioned by a line across the first polygon structure; and generate, based on the second image, a geo-image comprising corresponding spatial-reference information for one or more pixels in the geo-image, the geo-image comprising one of the first portion and the second portion in the second image.

In accordance with still another aspect, there is provided a computer-implemented system for detecting a boundary in images. The system includes at least one processor and memory in communication with said at least one processor, wherein the memory stores instructions, when executed at said at least one processor, cause said system to: receive or access a first image comprising a first polygon structure and a graphical indication representative of a property located within the first polygon structure; and generate, using a data model representing a neural network, a second image based on the first image and the graphical indication within the first polygon structure.

In some embodiments, the second image is generated by splitting the first polygon structure in the first image, and the second image comprises a first portion and a second portion partitioned by a line across the first polygon structure.

In some embodiments, the first portion and the second portion are bifurcated by the line across the first polygon structure.

In some embodiments, an placement of the line is determined based on the graphical indication representative of the property located within the first polygon structure, and wherein the one or second portion of the second image comprises the graphical indication representative of the property.

In some embodiments, the neural network is an encoder, and the instructions when executed at said at least one processor cause said system to generate the second image using a variational autoencoder (VAE) including the encoder and a second neural network comprising a decoder.

In some embodiments, the VAE is trained by: computing a loss function based on the second image and a ground truth label image associated with the first image; and updating weights of the VAE based on optimizing the loss function.

In some embodiments, the encoder and decoder each comprises three convolutional layers.

In some embodiments, the instructions when executed at said at least one processor cause said system to further: generate a segmented image based on an aerial image comprising a plurality of properties, the segmented image comprising a plurality of segmented structures corresponding to the plurality of properties; generate a polygon image of the segmented image, the polygon image comprising a plurality of polygon structures corresponding to the plurality of segmented structures; and generate the first image based on the polygon image by selecting the first polygon structure from the plurality of polygon structures based on a coordinate location of a property, the coordinate location corresponding to the graphical indication representative of the property located within the first polygon structure.

In some embodiments, the segmented image is generated based on a UNET-VGG16 neural network model.

In some embodiments, the instructions when executed at said at least one processor cause said system to extract a polygon image based on the second image.

In some embodiments, generating the first image may include: selecting the first polygon structure from the plurality of polygon structures based on the coordinate location using a R* search tree; and adding the graphical indication representative of the property based on the coordinate location.

In accordance with one aspect, there is provided a computer-implemented method for detecting a boundary in images, the method including: receiving or accessing a first image comprising a first polygon structure and a graphical indication representative of a property located within the first polygon structure; and generating, using a data model representing a neural network, a second image based on the first image and the graphical indication within the first polygon structure.

In some embodiments, the method includes splitting the first polygon structure in the first image to generate the second image, and the second image comprises a first portion and a second portion partitioned by a line across the first polygon structure.

In some embodiments, the first portion and the second portion are bifurcated by the line across the first polygon structure.

In some embodiments, an placement of the line is determined based on the graphical indication representative of the property located within the first polygon structure, and wherein the one or second portion of the second image comprises the graphical indication representative of the property.

In some embodiments, the neural network is an encoder, and the method comprises generating the second image using a variational autoencoder (VAE) including the encoder and a second neural network comprising a decoder.

In some embodiments, the VAE is trained by computing a loss function based on the second image and a ground truth label image associated with the first image; and updating weights of the VAE based on optimizing the loss function.

In some embodiments, the encoder and decoder each comprises three convolutional layers.

In some embodiments, the method further includes: generating a segmented image based on the aerial image, the segmented image comprising a plurality of segmented structures corresponding to the plurality of properties; generating a polygon image of the segmented image, the polygon image comprising a plurality of polygon structures corresponding to the plurality of segmented structures; and generating the first image based on the polygon image by selecting the first polygon structure from the plurality of polygon structures based on a coordinate location of a property, the coordinate location corresponding to the graphical indication representative of the property located within the first polygon structure.

In some embodiments, the segmented image is generated based on a UNET-VGG16 neural network model.

In some embodiments, the method further includes extracting a polygon image based on the second image.

In some embodiments, generating the first image may include: selecting the first polygon structure from the plurality of polygon structures based on the coordinate location using a R* search tree; and adding the graphical indication representative of the property based on the coordinate location.

In accordance with still another aspect, there is provided a computer-implemented method for selecting a polygon structure from one or more images, the method includes: generating a segmented image based on an aerial image comprising a plurality of properties, the segmented image comprising a plurality of segmented structures corresponding to the plurality of properties; generating a polygon image of the segmented image, the polygon image comprising a plurality of polygon structures corresponding to the plurality of segmented structures; and generating the first image based on the polygon image by selecting a final polygon structure from the plurality of polygon structures based on a coordinate location of a property using a R* search tree.

In some embodiments, the R* search tree may be performed on a plurality of aerial images to select the final polygon structure.

Other features will become apparent from the drawings in conjunction with the following description.

BRIEF DESCRIPTION OF DRAWINGS

In the figures which illustrate example embodiments,

FIG. 6 shows example polygons from an image segmentation model and various polygon images associated with the polygons from the image segmentation model.

FIGS. 7 and 8 show example outputs from an image segmentation model, predicted polygons from an example neural network model for image correction, and corresponding ground truth polygons for training the neural network model for image correction.

FIG. 10 shows an example process performed by the system in FIG. 1, in accordance with an embodiment.

FIGS. 11 and 12 show example outputs from an image segmentation model, predicted polygons from another example neural network model for image correction, and corresponding ground truth polygons for training the example neural network model.

DETAILED DESCRIPTION

Polygon extraction with high accuracy from high resolution aerial images has a number of practical applications, such as urban planning, maintaining or updating of geospatial database, and property evaluation. Deep learning based image segmentation techniques have been applied for image segmentation on aerial images. However, in at least the field of property evaluation, a bottleneck and challenge of polygon extraction in aerial images is related to separation and split of segments or polygons of adjacent properties in the generated segmented images, where a segment or polygon cover two or more adjacent properties. The described embodiments herein address this problem by using a machine learning model as a correction model for revising or modifying a polygon structure extracted from an image segmentation model, when the polygon structure covers or corresponds to more than one single properties.

The revised polygon structure may be processed as a revised segmented image and saved as the proper segment for a property. Either the revised polygon structure or the revised segmented image can be used for a number of practical applications, such as building foot print features, measurement of interior and exterior space for the property, or simply stored as part of a new set of imagery features in a property evaluation model for boosting the accuracy of property evaluation model.

In some embodiments, an image (e.g., an aerial image) including multiple properties on a piece of land may be received as input to an image segmentation model (e.g., a U-Net model with VGG-16 encoder also known as "UNET-VGG"). The image segmentation model may output segmented image containing multiple segmented structures, each structure corresponding to at least one property on the land. The segmented image may be processed to generate a polygon image containing multiple polygon structures. At least one coordinate (e.g., latitude and longitude) location is used to select one out of the multiple polygon structures from the polygon image. The selection process may be implemented using a R* search algorithm or search tree.

The polygon structure selected based on the coordinate location information can then be sent as input to a machine learning model (e.g., a Variational Autoencoder or VAE), which is trained to: determine if the polygon structure should be split; and if it should be split, the polygon structure is split into two or more polygons, and one of the two or more polygons is mapped to the proper property having the coordinate location.

Figure 1:
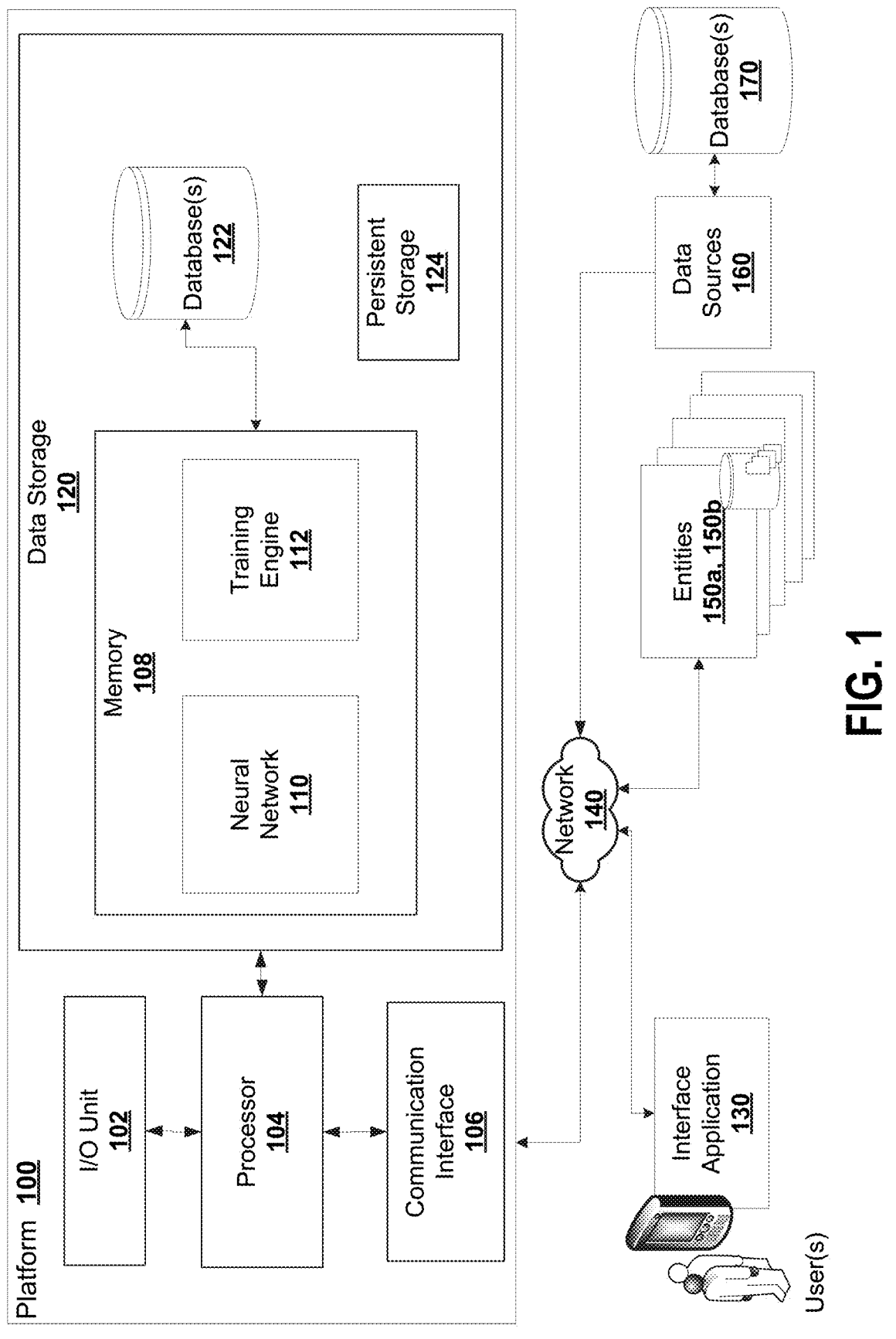
FIG. 1 is an example schematic diagram of a training system for training a neural network to processing a segmented image from an image segmentation model, in accordance with an embodiment.

A general computer system is described next in which the various neural network models may be implemented for training. FIG. 1 is a high-level schematic diagram of an example computer-implemented system 100 for training a neural network 110, exemplary of embodiments. For example, one or more automated agents can be instantiated and trained by training engine 112, where each automated agent maintains and updates a respective neural network 110.

As detailed herein, in some embodiments, system 100 may include features adapting it to perform certain specialized purposes, e.g., as a training platform to train a neural network 110 to generate predictions or images based on a given set of feature data, which can also be images. In such embodiments, system 100 may be referred to as platform 100 for convenience.

Referring now to the embodiment depicted in FIG. 1, platform 100 (which may be referred to as system 100 throughout the disclosure) can include an I/O unit 102, a processor 104, communication interface 106, and data storage 120. The I/O unit 102 can enable the platform 100 to interconnect with one or more input devices, such as a keyboard, mouse, camera, touch screen and a microphone, and/or with one or more output devices such as a display screen and a speaker.

A processor 104 is configured to execute machine-executable instructions to train a neural network 110 through a training engine 112. The training engine 112 can be configured to generate signals based on one or more rewards or incentives, such as a loss function, to train the neural network 110 to perform tasks more optimally, e.g., to minimize and maximize certain performance metrics such as minimizing risk or a loss function. For example, the training engine 112 may be configured to perform and execute standard supervised learning, where the input to the training engine 112 may include feature data (e.g., images), predicted data (e.g., predicted images), and generated predictions (e.g., generated images).

The platform 100 can connect to an interface application 130 installed on user device to receive input data. Entities 150a, 150b can interact with the platform to receive output data and provide input data. The entities 150a, 150b can have at least one computing device. The platform 100 can train one or more neural networks 110. The trained neural networks 110 can be used by platform 100 or can be for transmission to entities 150a, 150b, in some embodiments. The platform 100 can, for example, process images using the neural network 110 in response to commands from entities 150a, 150b, in some embodiments.

The platform 100 can connect to different data sources 160 and databases 170 to receive input data and receive output data for storage. The input data can include feature data, such as, for example, segmented images having one or more polygon structures. Network 140 (or multiple networks) is capable of carrying data and can involve wired connections, wireless connections, or a combination thereof. Network 140 may involve different network communication technologies, standards and protocols, for example.

The processor 104 can execute instructions in memory 108 to implement aspects of processes described herein. The processor 104 can execute instructions in memory 108 to configure a data collection unit, interface unit (to provide control commands to interface application 130), neural network 110, training engine 112, and other functions described herein. The processor 104 can be, for example, any type of general-purpose microprocessor or microcontroller, a digital signal processing (DSP) processor, an integrated circuit, a field programmable gate array (FPGA), a reconfigurable processor, or any combination thereof.

Figure 2:
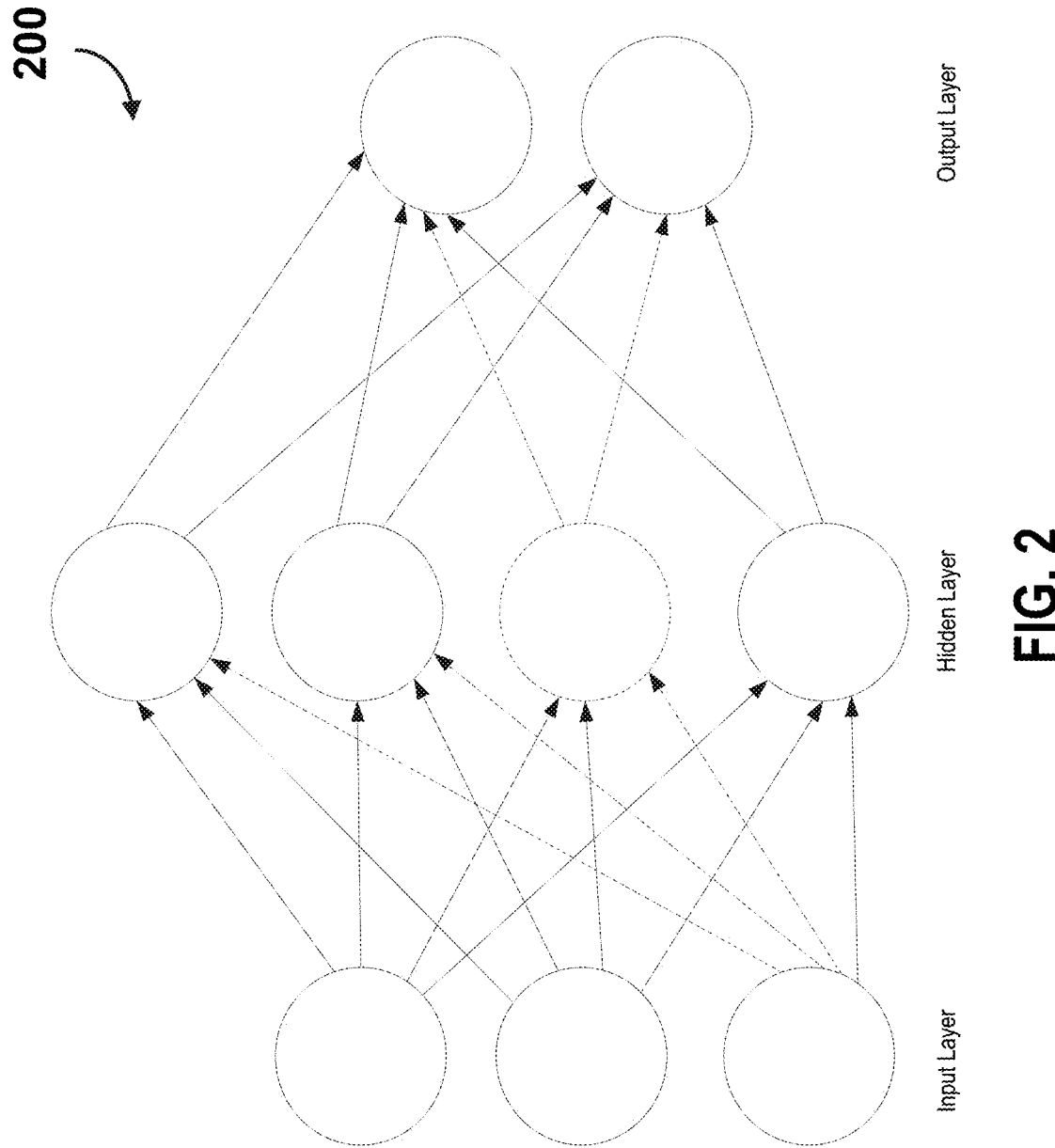
FIG. 2 is a schematic diagram of an example neural network maintained at the computer-implemented system of FIG. 1.

FIG. 2 is a schematic diagram of an example neural network 200 according to some embodiments. The example neural network 200 can include an input layer, a hidden layer, and an output layer. The neural network 200 processes input data using its layers based on weights, for example.

Referring again to FIG. 1, the interface application 130 interacts with the platform 100 to exchange data (including control commands) and generates visual elements for display at user device. The visual elements can represent neural networks 110 and output generated by neural networks 110.

Memory 108 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 120 can include memory 108, databases 122, and persistent storage 124.

The communication interface 106 can enable the platform 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The platform 100 can be operable to register and authenticate users (using a login, unique identifier, and password for example) prior to providing access to applications, a local network, network resources, other networks and network security devices. The platform 100 may serve multiple users which may operate trade entities 150a, 150b.

The data storage 120 may be configured to store information associated with or created by the components in memory 108 and may also include machine executable instructions. The data storage 120 includes a persistent storage 124 which may involve various types of storage technologies, such as solid state drives, hard disk drives, flash memory, and may be stored in various formats, such as relational databases, non-relational databases, flat files, spreadsheets, extended markup files, etc.

Figure 3:
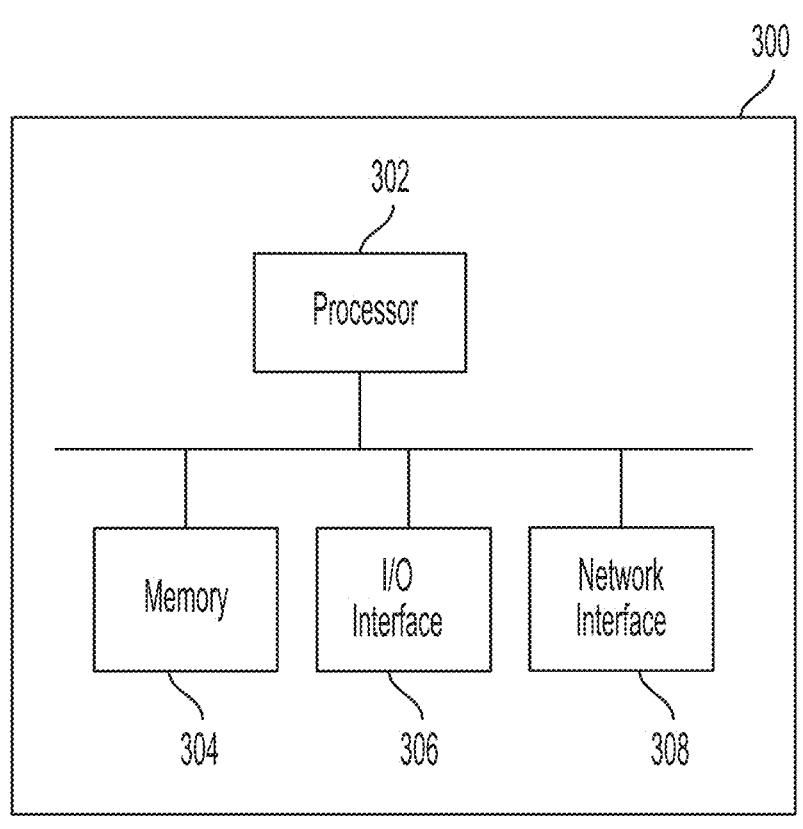
FIG. 3 is a schematic diagram of a computing device that implements a training system in FIG. 1, in accordance with an embodiment.

FIG. 3 is a schematic diagram of another example computing device 300 that implements a system (e.g., the training engine 112 on platform 100) for training an a neural network 110, in accordance with an embodiment. As depicted, computing device 300 includes one or more processors 302, memory 304, one or more I/O interfaces 306, and, optionally, one or more network interfaces 308.

Each processor 302 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 304 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 304 may store code executable at processor 302, which causes training system to function in manners disclosed herein. Memory 304 includes a data storage. In some embodiments, the data storage includes a secure datastore. In some embodiments, the data storage stores received data sets, such as textual data, image data, or other types of data.

Each I/O interface 306 enables computing device 300 to interconnect with one or more input devices, such as a keyboard, mouse, camera, touch screen and a microphone, or with one or more output devices such as a display screen and a speaker.

Each network interface 308 enables computing device 300 to communicate with other components, to exchange data with other components, to access and connect to network resources, to serve applications, and perform other computing applications by connecting to a network such as network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The methods disclosed herein may be implemented using a system that includes multiple computing devices 300. The computing devices 300 may be the same or different types of devices.

Each computing devices may be connected in various ways including directly coupled, indirectly coupled via a network, and distributed over a wide geographic area and connected via a network (which may be referred to as "cloud computing").

For example, and without limitation, each computing device 300 may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein.

Figure 4:
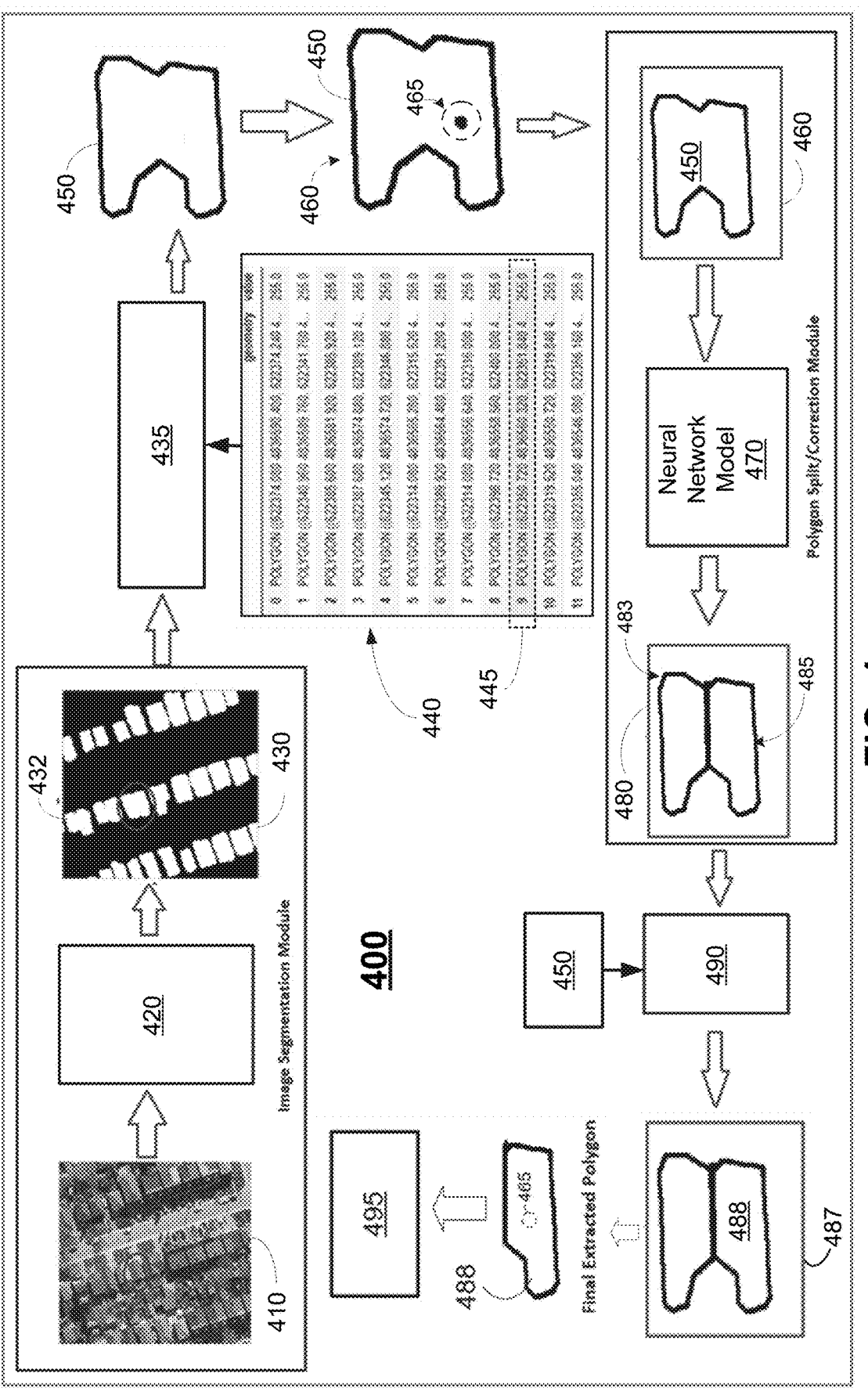
FIG. 4 is an example schematic diagram of an architecture for processing a segmented image from an image segmentation model, in accordance with an embodiment.

FIG. 4 is an example schematic diagram of an architecture 400 for correcting a segmented image from an image segmentation model or module 420, in accordance with an embodiment. The revised polygon structure may be processed as a revised segmented image and saved as the proper segment for a property.

In some embodiments, an image (e.g., an aerial image) 410 including multiple properties on a piece of land may be received as input to an image segmentation model or module 420 (e.g., a U-Net model with VGG-16 encoder also known as "UNET-VGG"). The image segmentation model 420 may output a segmented image 430 containing multiple segmented structures 432, each segmented structure 432 corresponding to at least one property on the land. The segmented image 430 may be processed to generate a polygon image 435 containing multiple polygon structures. Ideally, each property in the aerial image 410 should have a corresponding segmented structure in the segmented image 430. Due to existing technical constraints, some of the segmented structure, such as segmented structure 432, may in fact correspond to two properties in the aerial image 410.

In some embodiments, the polygon image 435 can be generated by using a library (e.g., Solaris library). For example, polygon structures in can be extracted from segmented image 430 in the format of a geographic data structure, then plotted based on Python libraries.

At least one coordinate (e.g., latitude and longitude) location 445 is used to select one 450 out of the multiple polygon structures from the polygon image 435. The selection process may be implemented using a R* search algorithm or search tree.

Although deep-learning approaches have shown significant improvements in the results of image segmentation in recent years, most neural networks still cannot achieve sufficiently accurate segmentation results when processing high-resolution remote sensing images such as aerial images. The main bottleneck of existing state-of-the-art models is related to separation and split of close-by properties, therefore a correction model, which can be a trained neural network model, is implemented in the embodiments described herein to split the segmented images properly.

In some embodiments, the polygon image 435 can be used to generate a first image 460 by selecting the first polygon structure 450 from the plurality of polygon structures in the polygon image 435, based on a given set of coordinate location 445 of a property.

In some embodiments, as an optional step, the coordinate location 445 may be used to place a graphical indication 465 representative of the property located within the first polygon structure 450. The graphical indication 465 may be shown as a dot and added to the first polygon structure 450 to generate the first image 460.

In some embodiments, the first polygon structure 450 may be processed by a dilation operation in order to highlight or extend the boundaries of polygon. The dilation operation may add pixels to the boundaries of the polygon.

The coordinate location 445 may be part of a set of spatial-reference information 440 including a plurality of coordinate locations 445 that are associated with the aerial image 410, or at least associated with a group of aerial images including the aerial image 410. Each coordinate location, such as coordinate location 445, may include a latitude value and a longitude value. An aerial image 410 may include at least one coordinate location for each of the properties or structure identified on the aerial image 410. For instance, the aerial image 410 may contain georeferenced or geo-coordinates for one or more pixels within the image.

In some embodiments, the spatial-reference information 440 includes at least one of: Global Positioning System (GPS) coordinates, geographic coordinate system (GCS) coordinates, projected coordinate system coordinates, Cartesian system coordinates, polar system coordinates, and geodetic datum.

For example, GCS coordinates may include longitude and latitude information. One or more pixels in the aerial image 410 may be associated with a corresponding longitude and latitude coordinate information. The corresponding spatial-reference information may be stored in a separate file associated with the aerial image 410, or in some embodiments, the corresponding spatial-reference information may be stored as part of the aerial image 410.

In some embodiments, the aerial image 410 is based on a Tagged Image File Format (TIFF), such as a GeoTIFF image.

In some embodiments, the system 100 may: generate a segmented image 430 based on an aerial image 410 comprising a plurality of properties, the segmented image 430 comprising a plurality of segmented structures 432 corresponding to the plurality of properties; generate a polygon image 435 of the segmented image 430, the polygon image 435 comprising a plurality of polygon structures corresponding to the plurality of segmented structures; and generate the first image 460 based on the polygon image 435 by selecting the first polygon structure 450 from the plurality of polygon structures based on a given coordinate location 445 of a property.

In other embodiments, the system 100 may: generate, using an image segmentation module 420, a segmented image 430 based on an aerial image 410 comprising a plurality of properties, the segmented image 430 comprising a plurality of segmented structures 432 corresponding to the plurality of properties; generate a polygon image 435 of the segmented image 430, the polygon image comprising a plurality of polygon structures corresponding to the plurality of segmented structures; generate the first image 460 based on the polygon image 435 by selecting the first polygon structure 450 from the plurality of polygon structures based on a coordinate location 445 of a property, the coordinate location 445 corresponding to the graphical indication representative 465 of the property located within the first polygon structure 450.

The aerial image 410 may be a GeoTIFF image with spatial-reference information such as GCS coordinate information or another type of geo locations.

In some embodiments, the aerial image 410 may be in any suitable GIS (geographic information system) file format for encoding geographical information into a computer file.

In some embodiments, the spatial-reference information 440 may include spatial coordinates and metadata regarding a medical image, where the image 410 may be said medical image, instead of aerial image.

The segmented image 430 may be a plain (i.e., non-GeoTIFF) image without spatial-reference information. For example, the segmented image 430 may be a PNG or JPEG image. The segmented image 430 may be, when needed, converted to GeoTIFF image based on the aerial image 410 and stored spatial-reference information 440. For instance, each polygon structure 432 in the segmented image 430 may be associated with a corresponding entry in the stored spatial-reference information 440.

The first polygon structure 450 may be a GeoTIFF image with a corresponding spatial reference information 445 such as GCS coordinate information or another type of geo locations.

The corresponding spatial reference information 445 may include, for example, a set of longitude and latitude coordinate information for each of one or more pixels of the first polygon structure 450.

The first image 460 may be a plain image (e.g, PNG, JPEG) or a GeoTIFF image, as the neural network model 470 is configured to process the first image 460 and generate a second image 480 with or without the corresponding spatial reference information 445.

The first image 460 may be a plain image (e.g, PNG, JPEG) or a GeoTIFF image, as the neural network model 470 is configured to process the first image 460 and generate a second image 480 with or without the corresponding spatial reference information 445.

The first image 460 can be used as input to a correction model 470, such as a neural network model 470 (e.g., a Variational Autoencoder or VAE), which is trained to generate a second, reconstructed image 480. In order to generate the second image 480, the neural network model 470 is configured to determine: if the first polygon structure 450 in the first image 460 should be split; and if the polygon structure 450 should be split, how to split it into two or more portions or smaller polygons 483, 485.

In some embodiments, as an optional step, the neural network model 470 is configured to determine: if the first polygon structure 450 in the first image 460 should be split based on the graphical indication 465; and if the polygon structure 450 should be split, how to split it into two or more portions or smaller polygons 483, 485, if and when the first polygon structure 450 contains the graphical indication 465.

The output of the correction model 470 may be a reconstructed (second) image 480. The smaller polygons 483, 485 are partitioned by a line across the first polygon structure 450. In some embodiments, the polygons 483, 485 are bifurcated by the line across the first polygon structure 450.

The reconstructed image 480 and the final polygon 488 can be used for a number of practical applications 495, such as building foot print features, measurement of interior and exterior space for the property, or simply stored as part of a new set of imagery features in a property evaluation model for boosting the accuracy of property evaluation model.

The final polygon 485 may be a plain image (e.g, PNG, JPEG), and can be converted, via the image processing module 490, to a geo-image 487 using information from the first polygon structure 450, which has been stored on a local memory device. The information may include stored spatial-reference information 440, 445.

A portion 488 of the geo-image 487 (e.g., final geo-image polygon 488) can be transmitted to one or more geo-image processing applications 495 for generating command signals based on the corresponding spatial-reference information in the (or associated with) final geo-image polygon 488. The portion 488 of the geo-image 487 may be obtained by extracting corresponding polygon portion based on a given spatial-reference information, such as a given set of latitude and longitude coordinate information.

Figure 11:
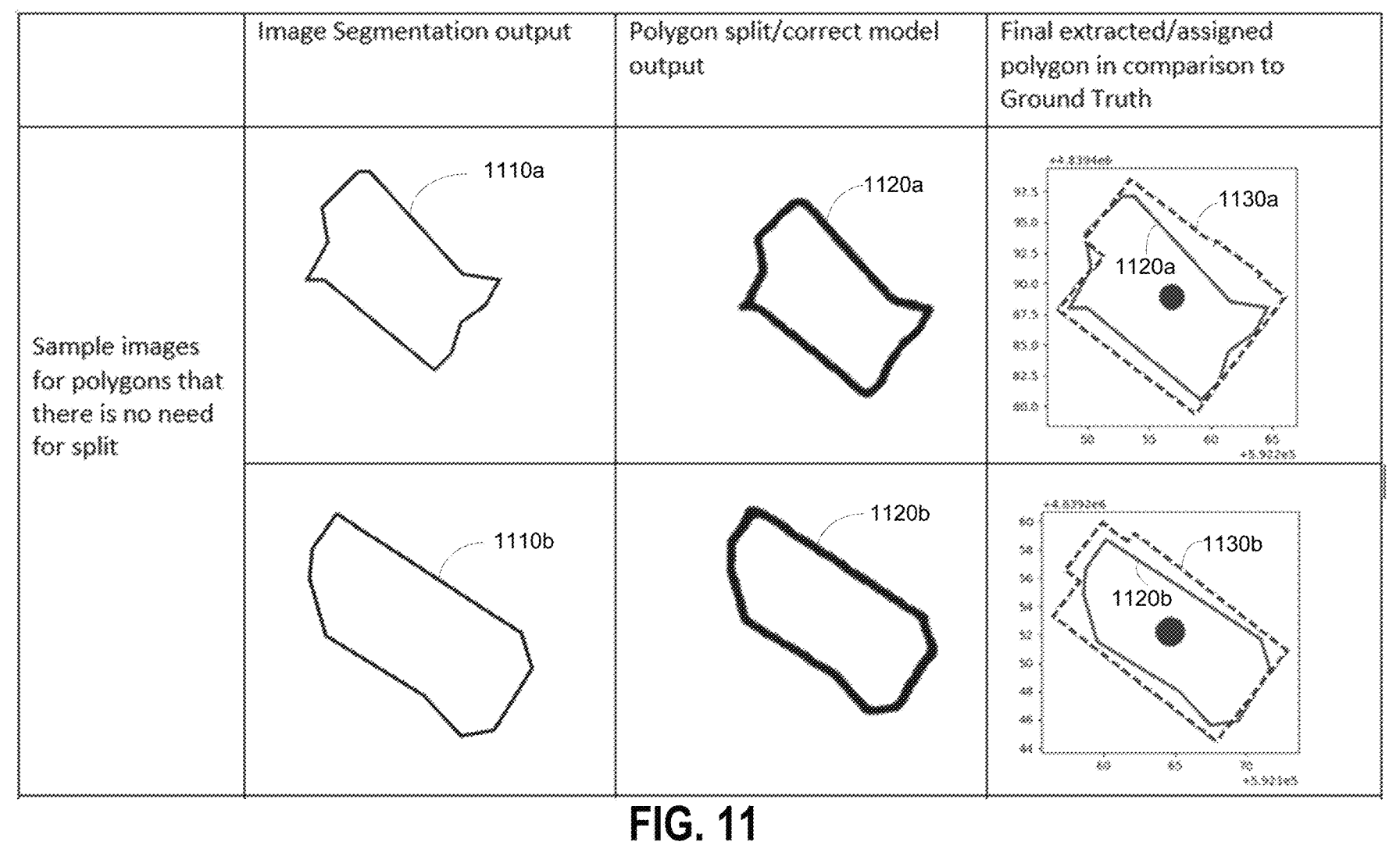

In some embodiments, as shown in FIG. 11, the final geo-image polygon 488 may be the entire geo-image 487, instead a partial portion of the geo-image 487. That is, in some cases, the neural network model 470 does not split the first image 460 to arrive at the second image 480.

Note that the final geo-image polygon 488 is also an geo-image.

An geo-image may be in any suitable GIS (geographic information system) file format for encoding geographical information into a computer file. For example, GeoTIFF.

The final geo-image polygon 488 may, in some embodiment, be stored in the form of a polygon vector set including a plurality of vertices, e.g., vertex 1, vertex 2 . . . vertex N, where each vertex has a set of corresponding spatial-reference information (e.g., GCS coordinates). The polygon vector set can be used to represent a geometrical shape having N vertices and N−1 edges, where adjacent vertices are connected with an edge.

For example, GCS coordinates may include longitude and latitude information. One or more pixels in the final geo-image polygon 488 may be associated with a corresponding longitude and latitude coordinate information. The corresponding spatial-reference information may be stored in a separate file associated with the final geo-image polygon 488, or in some embodiments, the corresponding spatial-reference information may be stored as part of the final geo-image polygon 488.

In some embodiments, the final geo-image polygon 488 is based on a Tagged Image File Format (TIFF).

In some embodiments, the final geo-image polygon 488 is also processed by the image processing module 490 to remove any graphical indication 465, if it existed in the first image 460.

In some embodiments, an example geo-image processing application 495 may be an application configured to estimate a feature of a property identified by the final geo-image polygon 488 based on the corresponding spatial-reference information in the (or associated with) final geo-image polygon 488. For example, the corresponding spatial-reference information may be used to compute at least one of: an estimated square footage, an estimated number of parking spaces, an estimated number of bedrooms and/or bathrooms, and an estimated market value of the property.

In some embodiments, an example geo-image processing application 495 may be an application configured to identify a specific physical structure of a property identified by the final geo-image polygon 488 based on the corresponding spatial-reference information in the (or associated with) final geo-image polygon 488. For example, a shape of the final geo-image polygon 488 and the corresponding spatial-reference information may be used to identify a standalone backyard gazebo, a front yard parking cover, and so on. The identified physical structure may be further used to determine if said physical structure has breached a local bylaw or regulation, when cross-referenced with an electronic database storing said local bylaw or regulation.

In some embodiments, the final geo-image polygon 488 may be part of a medical image such as an X-ray or MRI image, and the example geo-image processing application 495 may be an medical image application configured to, based on the shape of the final geo-image polygon 488 and the corresponding spatial-reference information, determine at least one of: a possible location of tumour, a possible size of tumour, and a possible area requiring further medical tests or observation for a patient. In these cases, the corresponding spatial-reference information may further include metadata associated with the medical image, including for example, patient info, time and location of when the medical image is taken, and so on. The output of the geo-image processing application 495 may be further sent to a medical professional for medical diagnosis or treatment.

Figure 5:
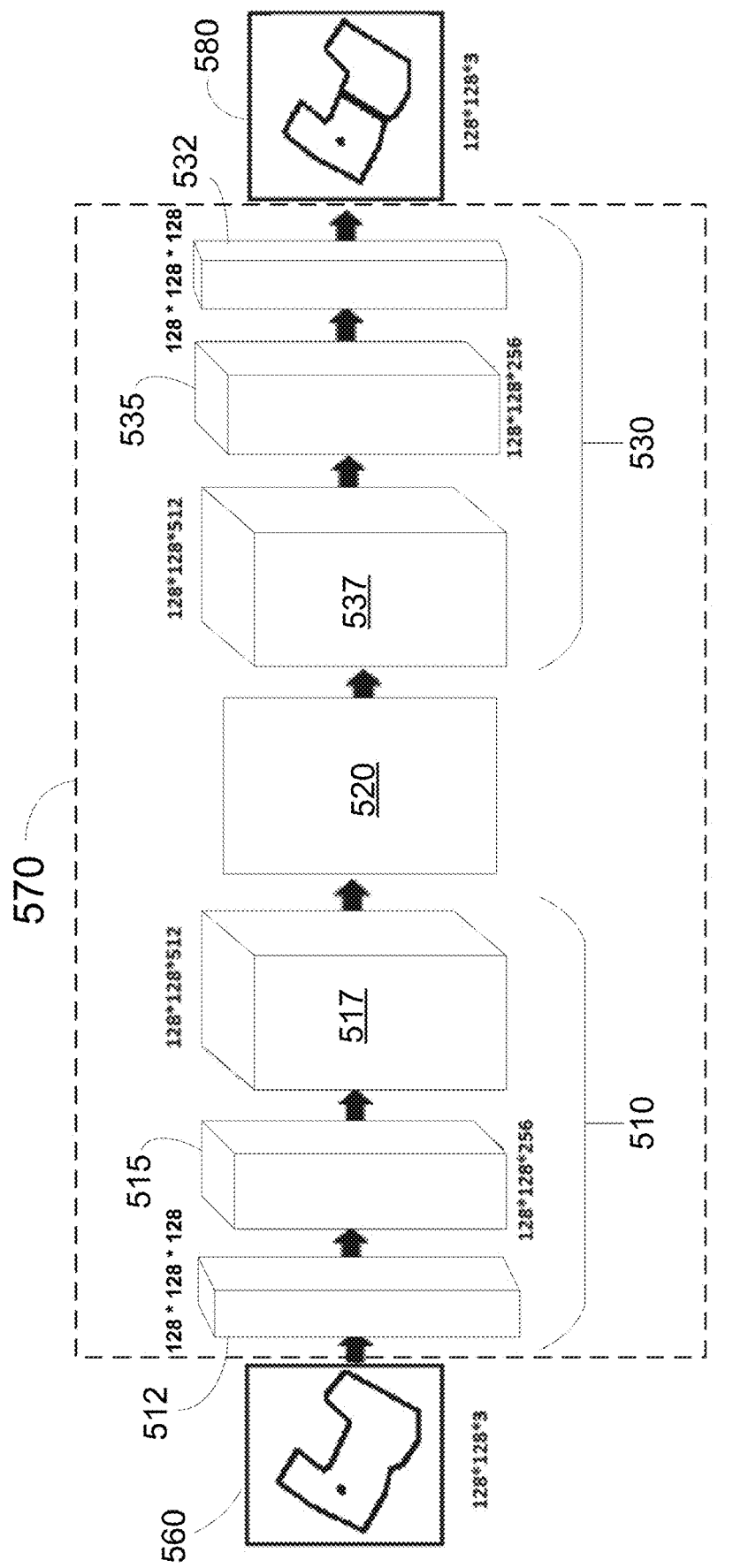
FIG. 5 shows an example neural network model for image correction implemented using a variational autoencoder (VAE), in accordance with an embodiment.

In some embodiments, the neural network model 470 can include a deep learning based model, such as a Variational Autoencoder (VAE) for processing the first image 460. FIG. 5 shows an example correction model implemented using a variational autoencoder (VAE) 570, in accordance with an embodiment. The VAE 570 can be configured to receive an input image 560 and execute a reconstruction operation to generate the second, reconstructed image 580. In the new reconstructed image 580, segments of close by properties are split based on a location of the graphical indication within the first image 560.

Variational Autoencoders (VAEs) have emerged as one deep learning technique for unsupervised learning of complicated data distributions. VAEs compress data into a lower-dimensional representation which can be used for quantitative comparisons, and generation of reconstructed data or images. VAEs are built on top of function approximators (neural networks) efficiently trained with stochastic gradient descent. VAEs have already been used to generate many kinds of complex data, including handwritten digits, faces, house numbers, and predicting the future from static images.

The VAE 570 can be adapted to overcome various problems associated with polygon extraction in aerial images related to separation or split of segments of close by properties in the segmented images. The VAE 570 can be used to reconstruct the boundaries of the close by properties in a given input image 560. A reconstruction operation is utilized and a new reconstructed image 580 is generated. The training process of the VAE 570 may require manually prepared dataset, which can include original images or polygons with coordinate locations, and manually prepared split (or not split) images with coordinate locations.

In FIG. 5, the VAE 570 includes an encoder 510 and a decoder 530. The encoder 510 is configured to take as input an image 560 of a polygon structure, and condense the image 560 to a lower-dimensional encoded dataset in a latent space 520. The decoder 530 is configured to take the lower-dimensional dataset in the latent space 520 and generate a reconstructed image 580. Each of the encoder 510 and the decoder 530 can be a respective neural network configured to learn the best encoding-decoding scheme using an iterative optimisation process.

In some embodiments, the VAE 570 is implemented as consecutive blocks of Convolutional Neural Networks (CNN). Each of the encoder 510 and the decoder 530 includes three layers of convolutional layers. The encoder 510 includes convolutional layers 512, 515 and 517. The decoder 530 includes convolutional layers 537, 535 and 532. The applied kernel in all convolutional layers is 2D kernel (4,4). The stride length is (1,1). The number of filters in the three convolutional layers 512, 515 and 517 of the encoder 510 is, respectively, 128, 256 and 512. The number of filters in the three convolutional layers 537, 535 and 532 of the decoder 530 is, respectively, 512, 256 and 128. Relu activation function may be applied in layers 1 and 2 in each of the encoder 510 and the decoder 530. The third convolution layer in the decoder 530 is followed by a sigmoid activation function. The applied learning rate can be set to 3e-4, while an example number of training epochs is 90.

During training, at each iteration or epoch, the VAE 570 receives an input image 560 and generates the output image 580, which is then compared with a ground truth image that has been manually prepared. The comparison may generate an error that is backpropagated through the VAE 570 to update one or more weights of the neural networks. The VAE 570 is trained to, when appropriate, split a given input image 560 based on a given coordinate location and the a physical characteristic, such as a shape, of the input image. In some embodiments, each coordinate location may be represented as a graphical indication on each input image 560. For example, if a coordinate location representative of a property is represented as a graphical indication with in the input image 560, the split of the input image 560 may be based on the placement of the graphical indication relative to the center of the input image 560, as well as its placement relative to the boundary of the input image 560.

For instance, If the graphical indication is located in the left half of the polygon, and relatively away from the center of the polygon within the first image 560, then the first image 560 should be split into smaller portions or polygons.

For training the VAE 570, two sets of datasets are prepared: input images and corresponding ground truth images. In some embodiments, the input images 560 can include the first image 460 from FIG. 4, which may include a first polygon structure 450 and graphical indication 465 of a coordinate location 445 of a property within the first polygon structure 450. This first image 460 may be generated based on a segmented image 430 from the image segmentation module 420.

Figure 6:
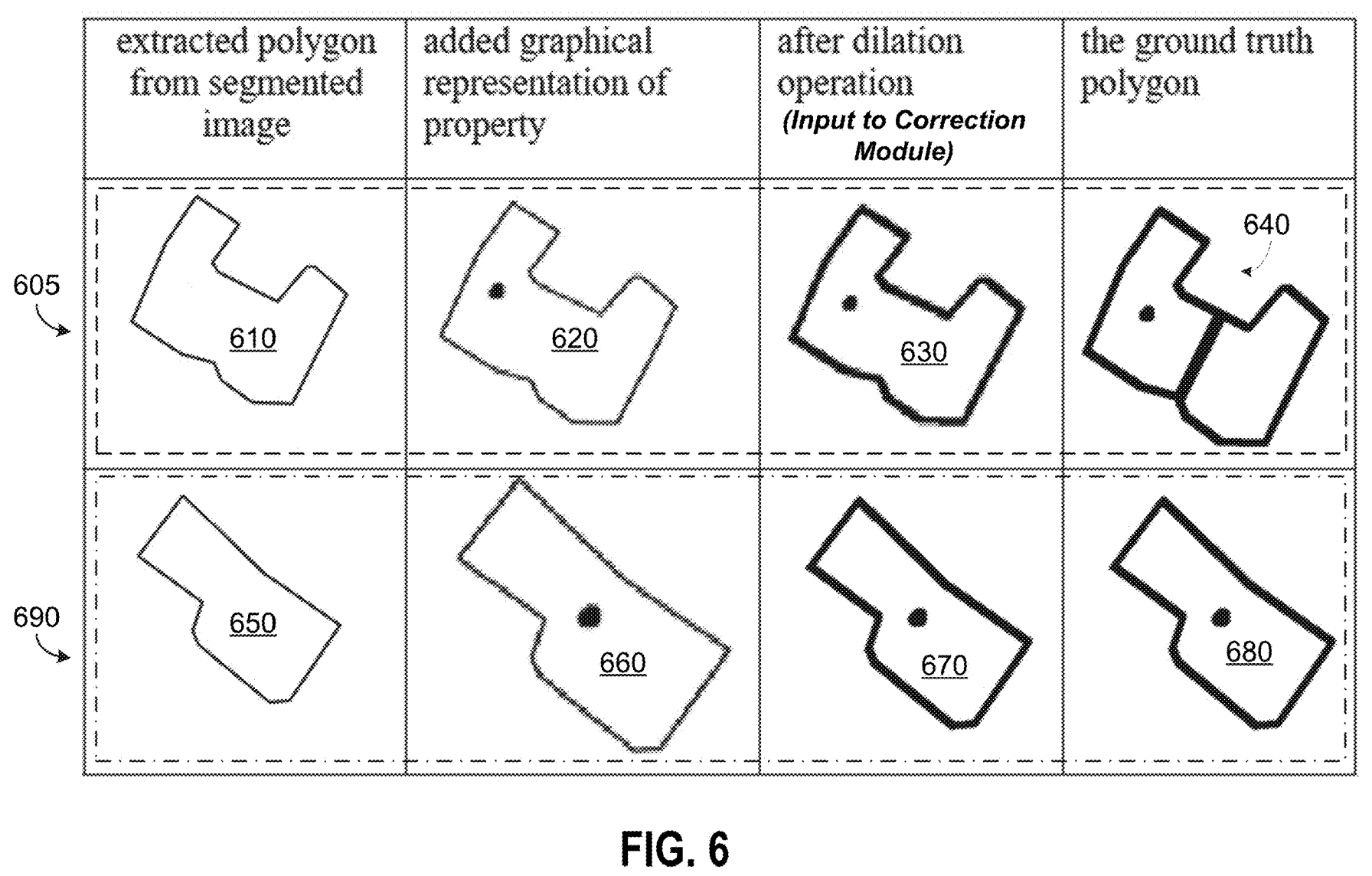

FIG. 6 shows example polygon structures 610, 650, which may be referred to as "polygons", extracted from segmented images 430 from an image segmentation model 420, and further processed into ground truth polygons 640, 680, which can be saved as images. The first group 605 of images (in the first row) includes the polygons that require a split. The second group 690 of images includes polygons that do not need a split.

Adding a graphical indication to polygons 610, 650 within their respective boundaries generates polygons 620, 660, respectively. The polygons 620, 660 are processed through a dilation operation, which adds pixels to the respective boundaries to thicken said boundaries, to generate input images 630, 670 to the VAE 570. Meanwhile, images 640, 680 each represents a ground truth image for input images 630, 670, respectively.

The graphical indication represents a coordinate location of a property within the each input images 630, 670. The location of each graphical indication in a polygon 630, 670 in an input image is used as a hint or feature for the VAE 570 to decide whether or not the polygon 630, 670 should be divided into two smaller polygons or not. Generally speaking, when the graphical indication is placed outside the center of the polygon 630, 670, the polygon 630, 670 should be split.

In some embodiments, in order to train the VAE 570, 2500 input images may be selected, where 500 images require split operation. To increase the total number of images requiring a correction and split, after manually generating the corresponding ground truth images, the images requiring a correction and split are rotated three times, each for 90, 180 and 270 degrees, respectively. Thus a balanced dataset is generated, including 2000 images requiring a split operation and 2000 images without any split requirement.

Figure 7:
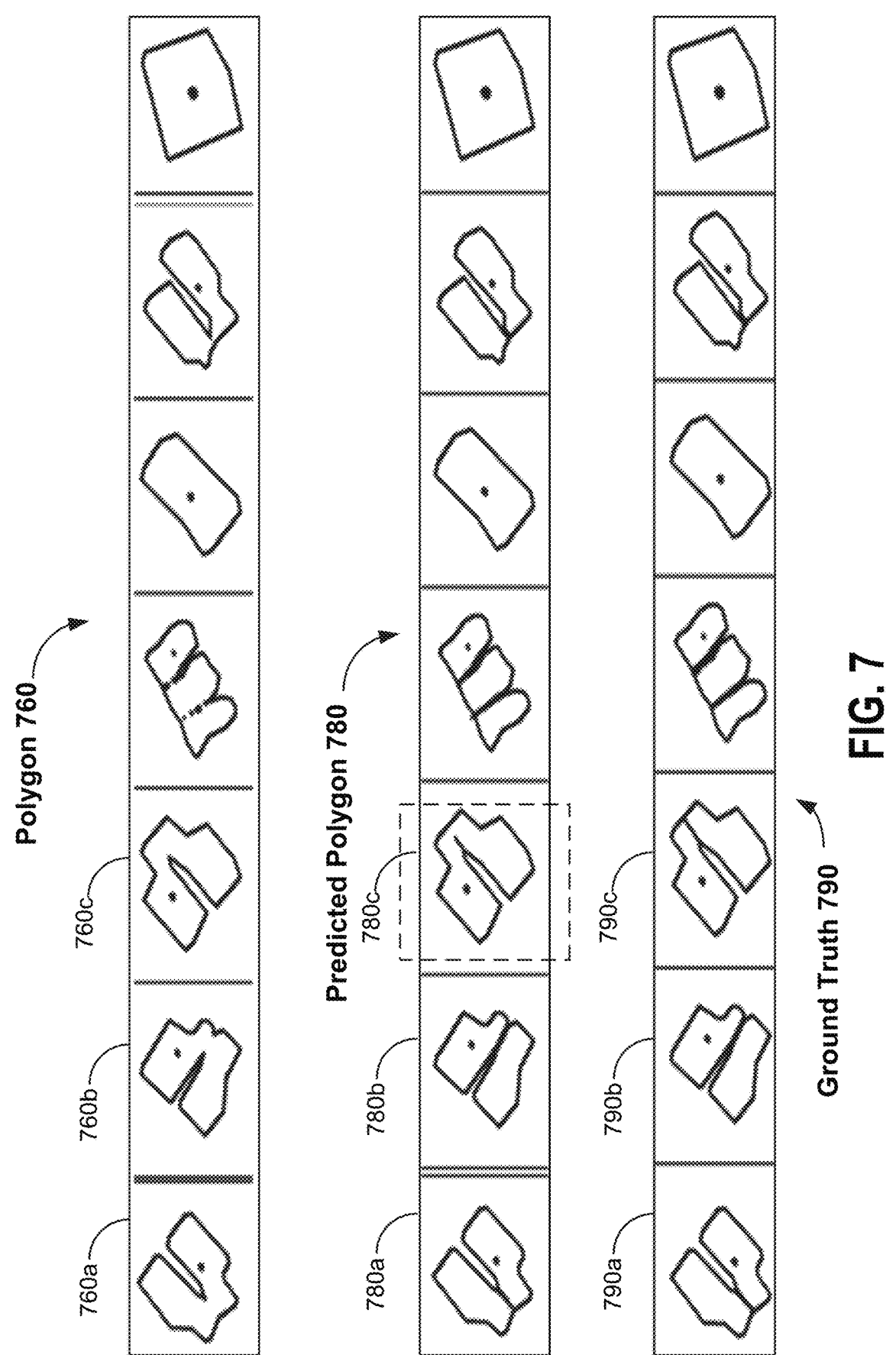
Figure 8:
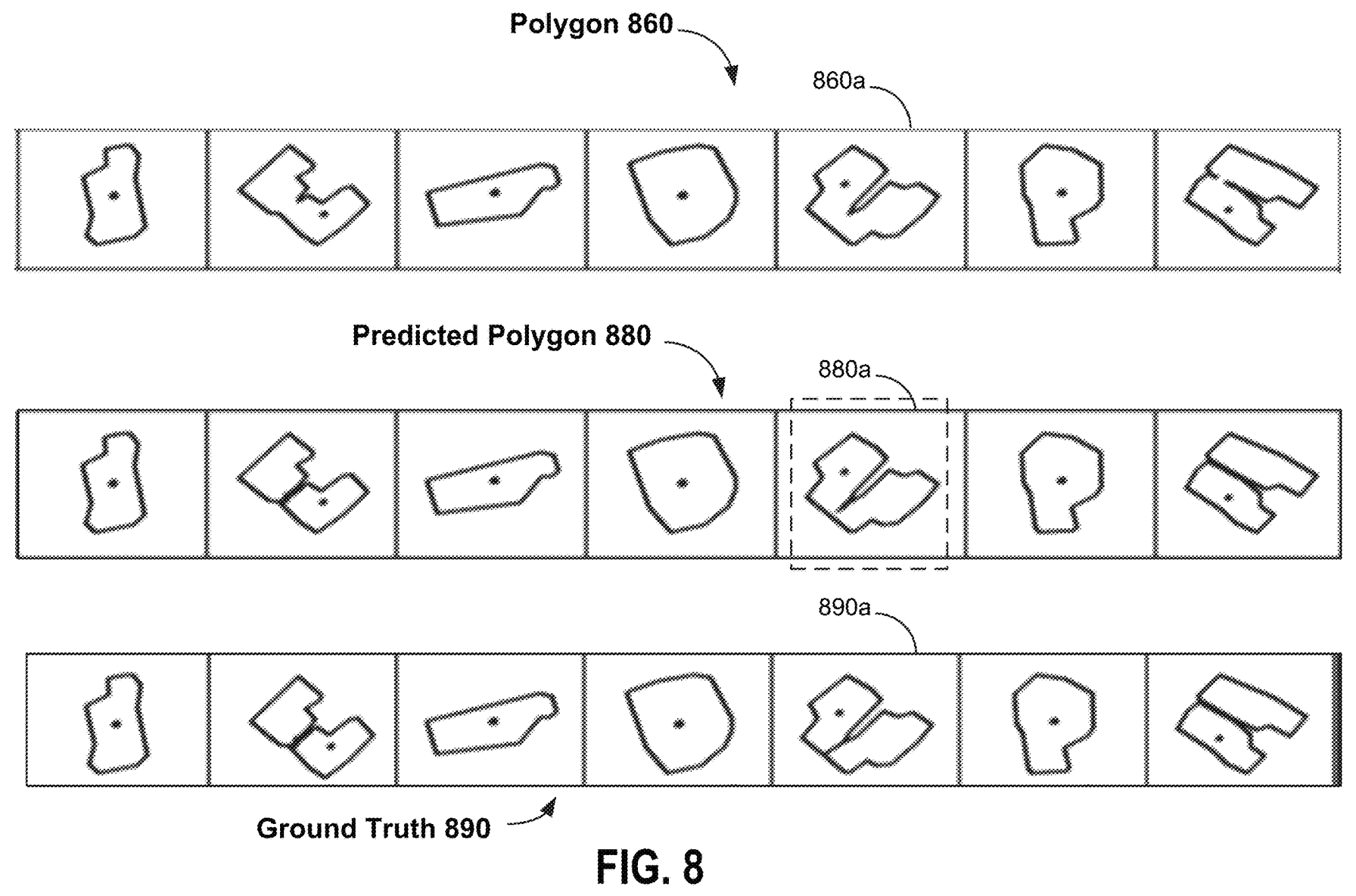

FIGS. 7 and 8 show example polygons from an image segmentation model used as input for training the VAE 570, predicted polygons from the VAE 570, and corresponding ground truth polygons for training the VAE 570. The first row of FIG. 7 includes a set of polygons 760 used as input images to the VAE 570 during the training process. The second row includes a set of predicted polygons 780 by the VAE 570 based on the set of polygons 760. The third row includes a set of ground truth polygons 790. More specifically, for the input image containing polygon 760*a*, the VAE 570 generates the predicted polygon 780*a*, which is compared to the ground truth image 790*a*. Similarly, for the input image containing polygon 760*b*, the VAE 570 generates the predicted polygon 780*b*, which is compared to the ground truth image 790*b* . . . and so on. As can be seen from FIG. 7, the predicted image 780*c* is incorrect (e.g., missing a small portion of the line bisecting the original polygon 760*c*) when compared to the ground truth image 790*c*.

Similarly, the first row of FIG. 8 includes a set of polygons 860 used as input images to the VAE 570 during the training process. The second row includes a set of predicted polygons 880 by the VAE 570 based on the set of polygons 860. The third row includes a set of ground truth polygons 890. As can be seen from FIG. 8, the predicted image 880*a* is incorrect (e.g., missing a small portion of the line bisecting the original polygon 860*a*) when compared to the ground truth image 890*a*.

FIG. 11 shows example outputs 1110*a*, 1110*b* from an image segmentation model 420, predicted polygons 1120*a*, 1120*b* from an example neural network model 470 (also referred to as "correction model") for image correction, and corresponding ground truth polygons 1130*a*, 1130*b* for training the example neural network model. In these two sets of examples in FIG. 11, the neural network model 470 did not split the input images.

FIG. 12 shows example outputs 1210*a*, 1210*b* from an image segmentation model 420, predicted polygons 1220*a*, 1220*b* from an example neural network model 470 (also referred to as "correction model") for image correction, respective final polygons 1240*a*, 1240*b* processed by the image processing module 490 based on the predicted polygons 1220*a*, 1220*b*, and corresponding ground truth polygons 1230*a*, 1230*b* for training the example neural network model. In these two sets of examples in FIG. 12, the neural network model 470 split the input images.

Figure 9:
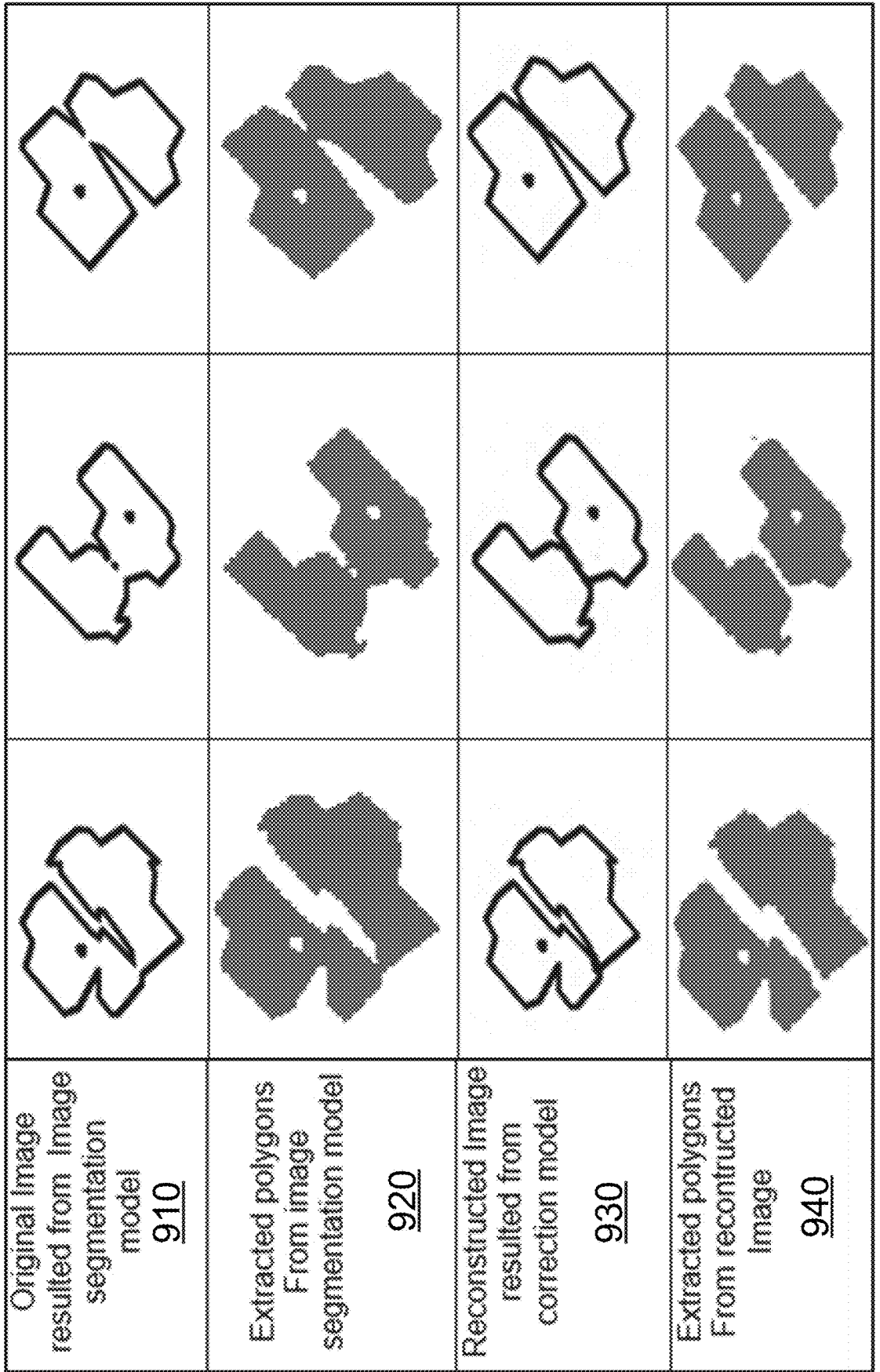
FIG. 9 shows example polygon images from an image segmentation model and a correction model, and corresponding extracted segments from the polygon images.

FIG. 9 shows the comparison of extracted polygons 940 between image segmentation model 420 and the correction model 470 (e.g., VAE 570). The first row 910 includes polygon images 460 generated based on segmented images 430 from image segmentation model 420. The second row 920 includes extracted polygons based on the polygon images 460. The third row 930 includes output images 480, 580 from the correction model 470 (e.g., VAE 570). The fourth row 940 includes extracted polygons 485 from the output images 480, 580 generated by the correction model 470 (e.g., VAE 570). Based on a comparison of polygons in the second row 920 and in the fourth row 940, the output images 480, 580 generated by the correction model 470 contain polygons that are properly split based on the graphical indication in the polygons shown in 910.

FIG. 10 shows an example process performed by the system 100 in FIG. 1, where system 100 is configured to implement the architecture 400 in FIG. 4, in accordance with an embodiment. At operation 1100, the system 100 may receive or access a first image 460 comprising a first polygon structure 450.

In some embodiments, as an optional feature, a graphical indication 465 representative of a property located within the first polygon structure 450 may be placed within the first image 460.

At operation 1200, the system 100 may generate, using a data model 470 representing a neural network, a second image 480 based on the first image 460.

In some embodiments, the second image 480 may be a plain image (e.g., non-geo-image).

In some embodiments, as an optional feature, the second image 480 may be generated based on the graphical indication 465 within the first polygon structure 450, if and when the first polygon structure 450 has a graphical indication 465 within.

In some embodiments, the second image 480 is generated by splitting the first polygon structure 450 in the first image 460, and the second image 480 comprises a first portion 483 and a second portion 485 partitioned by a line across the first polygon structure 450.

In some embodiments, the second image 480 is not a split of the first image 460.

In some embodiments, the first portion 483 and the second portion 485 are bifurcated by the line across the first polygon structure 450.

In some embodiments, an placement of the line is determined based on the graphical indication 465 representative of the property located within the first polygon structure 450, and where the one or second portion of the second image 480 includes the graphical indication 465 representative of the property, if and when the first polygon structure 450 has a graphical indication 465 within.

In some embodiments, the neural network 470 is an encoder 510, and the instructions when executed at said at least one processor cause said system to generate the second image 480, 580 using a variational autoencoder (VAE) 570 including the encoder 510 and a second neural network comprising a decoder 530.

In some embodiments, the VAE 570 is trained by: computing a loss function based on the second image and a ground truth label image associated with the first image; and updating weights of the VAE 570 based on optimizing the loss function.

In some embodiments, the encoder 510 and decoder 530 each comprises three convolutional layers.

In some embodiments, at operation 1300, the system 100 may generate, based on the second image 480, a geo-image polygon 488, which may be generated based on a final polygon image 485. The geo-image polygon 488 includes corresponding spatial-reference information for one or more pixels in the geo-image polygon 488.

In some embodiments, the corresponding spatial-reference information includes at least one of: Global Positioning System (GPS) coordinates, geographic coordinate system (GCS) coordinates, projected coordinate system coordinates, Cartesian system coordinates, polar system coordinates, and geodetic datum.

For example, GCS coordinates may include longitude and latitude information. One or more pixels in the geo-image polygon 488 may be associated with a corresponding longitude and latitude coordinate information. The corresponding spatial-reference information may be stored in a separate file associated with the geo-image polygon 488, or in some embodiments, the corresponding spatial-reference information may be stored as part of the geo-image polygon 488.

In some embodiments, the geo-image polygon 488 is based on a Tagged Image File Format (TIFF).

In some embodiments, the system 100 may, prior to step 1100: generate a segmented image 430 based on an aerial image 410 comprising a plurality of properties, the segmented image 430 comprising a plurality of segmented structures 432 corresponding to the plurality of properties; generate a polygon image 435 of the segmented image 430, the polygon image 435 comprising a plurality of polygon structures corresponding to the plurality of segmented structures; and generate the first image 460 based on the polygon image 435 by selecting the first polygon structure 450 from the plurality of polygon structures based on a given coordinate location 445 of a property.

In other embodiments, the system 100 may, prior to step 1100: generate a segmented image 430 based on an aerial image 410 comprising a plurality of properties, the segmented image 430 comprising a plurality of segmented structures 432 corresponding to the plurality of properties; generate a polygon image 435 of the segmented image 430, the polygon image comprising a plurality of polygon structures corresponding to the plurality of segmented structures; generate the first image 460 based on the polygon image 435 by selecting the first polygon structure 450 from the plurality of polygon structures based on a coordinate location 445 of a property, the coordinate location 445 corresponding to the graphical indication representative 465 of the property located within the first polygon structure 450.

The aerial image 410 may be a GeoTIFF image with spatial-reference information such as GCS coordinate information or another type of geo locations.

The segmented image 430 may be a plain (i.e., non-GeoTIFF) image without spatial-reference information. For example, the segmented image 430 may be a PNG or JPEG image. The segmented image 430 may be, when needed, converted to GeoTIFF image based on the aerial image 410 and stored spatial-reference information 440. For instance, each polygon structure 432 in the segmented image 430 may be associated with a corresponding entry in the stored spatial-reference information 440.

The first polygon structure 450 may be a GeoTIFF image with a corresponding spatial reference information 445 such as GCS coordinate information or another type of geo locations.

The corresponding spatial reference information 445 may include, for example, a set of longitude and latitude coordinate information for each of one or more pixels of the first polygon structure 450.

The first image 460 may be a plain image (e.g, PNG, JPEG) or a GeoTIFF image, as the neural network model 470 is configured to process the first image 460 and generate a second image 480 with or without the corresponding spatial reference information 445.

The first 483 or second portion 485 of the second image 480 may be a plain image (e.g, PNG, JPEG), and can be converted, via the image processing module 490, back to a GeoTIFF image using information from the stored spatial-reference information 440.

The final polygon image 485 may, in some embodiment, be stored in the form of a polygon vector set including a plurality of vertices, e.g., vertex 1, vertex 2 . . . vertex N, where each vertex has a set of corresponding spatial-reference information (e.g., longitude and latitude coordinates). The polygon vector set can be used to represent a geometrical shape having N vertices and N−1 edges, where adjacent vertices are connected with an edge.

The final polygon image 485 is also processed by the image processing module 490 to remove any graphical indication 465, if it existed in the first image 460.

In some embodiments, the segmented image 430 is generated based on a UNET-VGG16 neural network model 420.

In some embodiments, the system 100 may extract a polygon image 485 based on the second image 480.

In some embodiments, generating the first image 460 may include: selecting the first polygon structure 450 from the plurality of polygon structures based on the coordinate location using a R* search tree; and adding the graphical indication representative of the property based on the coordinate location.

At operation 1400, the system 100 may transmit a portion 488 of the geo-image 487 (e.g., final geo-image polygon 488) to one or more geo-image processing applications 495 that generate command signals based on the corresponding spatial-reference information in the (or associated with) the final geo-image polygon 488. The portion 488 of the geo-image 487 may be obtained by extracting corresponding polygon portion based on a given spatial-reference information, such as a given set of latitude and longitude coordinate information.

Note that the final geo-image polygon 488 is also an geo-image.

In some embodiments, an example geo-image processing application 495 may be an application configured to estimate a feature of a property identified by the final geo-image polygon 488 based on the corresponding spatial-reference information in the (or associated with) final geo-image polygon 488. For example, the corresponding spatial-reference information may be used to compute at least one of: an estimated square footage, an estimated number of parking spaces, an estimated number of bedrooms and/or bathrooms, and an estimated market value of the property.

In some embodiments, an example geo-image processing application 495 may be an application configured to identify a specific physical structure of a property identified by the final geo-image polygon 488 based on the corresponding spatial-reference information in the (or associated with) final geo-image polygon 488. For example, a shape of the final geo-image polygon 488 and the corresponding spatial-reference information may be used to identify a standalone backyard gazebo, a front yard parking cover, and so on. The identified physical structure may be further used to determine if said physical structure has breached a local bylaw or regulation, when cross-referenced with an electronic database storing said local bylaw or regulation.

In some embodiments, the final geo-image polygon 488 may be part of a medical image such as an X-ray or MRI image, and the example geo-image processing application 495 may be an medical image application configured to, based on the shape of the final geo-image polygon 488 and the corresponding spatial-reference information, determine at least one of: a possible location of tumour, a possible size of tumour, and a possible area requiring further medical tests or observation for a patient. In these cases, the corresponding spatial-reference information may further include metadata associated with the medical image, including for example, patient info, time and location of when the medical image is taken, and so on. The output of the geo-image processing application 495 may be further sent to a medical professional for medical diagnosis or treatment.

Embodiments performing the operations for anomaly detection and anomaly scoring provide certain advantages over manually assessing anomalies. For example, in some embodiments, all data points are assessed, which eliminates subjectivity involved in judgement-based sampling, and may provide more statistically significant results than random sampling. Further, the outputs produced by embodiments of system are reproducible and explainable.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The foregoing discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The embodiments and examples described herein are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A computer-implemented system for detecting a boundary in images, the system comprising:
at least one processor; and
memory in communication with said at least one processor, wherein the memory stores instructions when executed at said at least one processor, cause said system to:
receive or access a first image comprising a first polygon including image data indicative of a boundary of an area of a structure;
generate, using a data model representing a neural network, a second image based on the first image by dividing the area enclosed by the boundary of the structure in the first image, wherein the second image comprises a first portion of the area within the boundary and a second portion of the area within the boundary partitioned by a line across the structure, wherein the dividing of the area enclosed by the boundary of the structure is based at least in part on a coordinate location which is offset from the line; and generate, based on the second image, a geo-image comprising corresponding spatial-reference information for one or more pixels in the geo-image, the geo-image comprising one of the first portion and the second portion in the second image.

2. The system of claim 1, wherein the corresponding spatial-reference information comprises: Global Positioning System (GPS) coordinates, geographic coordinate system (GCS) coordinates, projected coordinate system coordinates, Cartesian system coordinates, polar system coordinates, or geodetic datum.

3. The system of claim 1, wherein the generating the second image comprises dividing the area enclosed by the boundary of the structure in the first image when a graphical indicator is in the first image.

4. The system of claim 1, wherein the first portion and the second portion are bifurcated by the line across the structure, and wherein the graphical indicator is offset from the line.

5. The system of claim 1, wherein a placement of the line is determined based on a graphical indication representative of a property located within the structure, and wherein the first or second portion of the second image comprises the graphical indication representative of the property.

6. The system of claim 1, wherein the neural network is an encoder, and the instructions when executed at said at least one processor cause said system to generate the second image using a variational autoencoder (VAE) including the encoder and a second neural network comprising a decoder.

7. The system of claim 6, wherein the VAE is trained by:
computing a loss function based on the second image and a ground truth label image associated with the first image; and
updating weights of the VAE based on optimizing the loss function.

8. The system of claim 7, wherein the encoder and decoder each comprises three convolutional layers.

9. The system of claim 1, wherein the instructions when executed at said at least one processor cause said system to further:
generate a segmented image based on an aerial image comprising a plurality of properties, the segmented image comprising a plurality of segmented structures corresponding to the plurality of properties;
generate a polygon image of the segmented image, the polygon image comprising a plurality of polygon structures corresponding to the plurality of segmented structures; and
generate the first image based on the polygon image by selecting the structure from the plurality of polygon structures based on a given coordinate location of a property.

10. The system of claim 8, wherein the segmented image is generated based on a UNET-VGG16 neural network model.

11. A computer-implemented method for detecting a boundary in images, the method comprising:
receiving or accessing a first image comprising a first polygon including image data indicative of a boundary of an area of a structure;
generating, using a data model representing a neural network, a second image based on the first image by dividing the area enclosed by the boundary of the structure in the first image, wherein the second image comprises a first portion of the area within the boundary and a second portion of the area within the boundary partitioned by a line across the structure, wherein the dividing of the area enclosed by the boundary of the structure is based at least in part on a coordinate location which is offset from the line; and
generating, based on the second image, a geo-image comprising corresponding spatial-reference information for one or more pixels in the geo-image, the geo-image comprising one of the first portion and the second portion in the second image.

12. The method of claim 11, wherein the corresponding spatial-reference information comprises: Global Positioning System (GPS) coordinates, geographic coordinate system (GCS) coordinates, projected coordinate system coordinates, Cartesian system coordinates, polar system coordinates, or geodetic datum.

13. The method of claim 11, wherein generating the second image comprises dividing the area enclosed by the boundary of the structure in the first image when a graphical indicator is in the first image.

14. The method of claim 11, wherein the first portion and the second portion are bifurcated by the line across the structure, and wherein the graphical indicator is offset from the line.

15. The method of claim 11, wherein a placement of the line is determined based on a graphical indication representative of a property located within the structure, and wherein the first or second portion of the second image comprises the graphical indication representative of the property.

16. The method of claim 11, wherein the neural network is an encoder, and the instructions when executed at said at least one processor cause said system to generate the second image using a variational autoencoder (VAE) including the encoder and a second neural network comprising a decoder.

17. The method of claim 16, wherein the VAE is trained by:
computing a loss function based on the second image and a ground truth label image associated with the first image; and
updating weights of the VAE based on optimizing the loss function.

18. The method of claim 11, further comprising, prior to receiving or accessing the first image:
generating a segmented image based on an aerial image comprising a plurality of properties, the segmented image comprising a plurality of segmented structures corresponding to the plurality of properties;
generating a polygon image of the segmented image, the polygon image comprising a plurality of polygon structures corresponding to the plurality of segmented structures; and
generating the first image based on the polygon image by selecting the structure from the plurality of polygon structures based on a given coordinate location of a property.

19. The method of claim 18, wherein the segmented image is generated based on a UNET-VGG16 neural network model.

20. A non-transitory computer-readable storage medium storing instructions which when executed adapt at least one computing device to:
receive or access a first image comprising a first polygon including image data indicative of a boundary of an area of a structure;
generate, using a data model representing a neural network, a second image based on the first image by dividing the area enclosed by the boundary of the structure in the first image, wherein the second image comprises a first portion of the area within the boundary and a second portion of the area within the boundary partitioned by a line across the structure, wherein the dividing of the area enclosed by the boundary of the structure is based at least in part on a coordinate location which is offset from the line; and generate, based on the second image, a geo-image comprising corresponding spatial-reference information for one or more pixels in the geo-image, the geo-image comprising one of the first portion and the second portion in the second image.

\* \* \* \* \*